(12) United States Patent
Seo et al.

(10) Patent No.: US 11,893,278 B2
(45) Date of Patent: Feb. 6, 2024

(54) MEMORY CONTROLLER AND MEMORY CONTROL METHOD FOR GENERATING COMMANDS BASED ON A MEMORY REQUEST

(71) Applicant: Samsung Electronics Co., Ltd., Suwon-si (KR)

(72) Inventors: Seungwoo Seo, Incheon (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 60 days.

(21) Appl. No.: 17/408,584

(22) Filed: Aug. 23, 2021

(65) Prior Publication Data

US 2022/0253246 A1    Aug. 11, 2022

(30) Foreign Application Priority Data

Feb. 8, 2021   (KR) .................. 10-2021-0017645
May 6, 2021   (KR) .................. 10-2021-0058640

(51) Int. Cl.
  *G06F 3/06*    (2006.01)
  *G06F 15/78*   (2006.01)

(52) U.S. Cl.
  CPC .......... *G06F 3/0659* (2013.01); *G06F 3/0611* (2013.01); *G06F 3/0656* (2013.01); *G06F 3/0673* (2013.01); *G06F 15/7821* (2013.01)

(58) Field of Classification Search
  CPC .. G06F 15/7821; G06F 3/0659; G06F 3/0656; G06F 3/0673; G06F 3/0604; G06F 7/57; G06F 7/5443; G06F 13/1668
  See application file for complete search history.

(56) References Cited

U.S. PATENT DOCUMENTS 6,402,795 B1   6/2002   Chu et al.
6,485,622 B1   11/2002   Fu
7,901,658 B2   3/2011   Weppner et al.
(Continued)

FOREIGN PATENT DOCUMENTS

KR   10-1858597 B1   5/2018
KR   10-1867219 B1   6/2018
(Continued)

*Primary Examiner* — Charles Rones
*Assistant Examiner* — Hewy H Li
(74) *Attorney, Agent, or Firm* — NSIP Law

(57) ABSTRACT

A memory controller includes a first buffer configured to receive a first memory request from a host and store the first memory request, a request scheduler configured to determine an order in which the first memory request is transferred to a command generator, a request generator configured to generate one or more second memory requests based on a generation parameter of the first memory request, in response to an address of the first memory request corresponding to a processing in memory (PIM) memory, the command generator configured to generate a first command corresponding to the first memory request and one or more second commands corresponding to the one or more second memory requests, and store the generated first command and the one or more second commands in a second buffer, and a command scheduler configured to schedule the first command and the one or more second commands.

18 Claims, 4 Drawing Sheets

(56) References Cited

U.S. PATENT DOCUMENTS

| | | | |
|---|---|---|---|
| 8,828,580 B2 | 9/2014 | Visco et al. | |
| 10,528,613 B2 | 1/2020 | Zhang | |
| 10,540,097 B2 | 1/2020 | Lea | |
| 10,592,121 B2 | 3/2020 | Malladi et al. | |
| 2014/0181427 A1* | 6/2014 | Jayasena | G06F 9/3455 711/154 |
| 2016/0098200 A1* | 4/2016 | Guz | G06F 11/30 711/154 |
| 2018/0006326 A1 | 1/2018 | O'Neill et al. | |
| 2018/0336035 A1 | 11/2018 | Choi et al. | |
| 2019/0079678 A1 | 3/2019 | Malladi et al. | |
| 2020/0356305 A1* | 11/2020 | Kim | G06F 3/0659 |
| 2021/0004229 A1* | 1/2021 | Benisty | G06F 9/30036 |

FOREIGN PATENT DOCUMENTS

| | | |
|---|---|---|
| KR | 10-2020-0013461 A | 2/2020 |
| KR | 10-2020-0081623 A | 7/2020 |
| KR | 10-2020-0108774 A | 9/2020 |
| KR | 10-2020-0129843 A | 11/2020 |
| WO | WO 2019/135319 A1 | 7/2019 |

\* cited by examiner

MEMORY CONTROLLER AND MEMORY CONTROL METHOD FOR GENERATING COMMANDS BASED ON A MEMORY REQUEST

CROSS-REFERENCE TO RELATED APPLICATIONS

This application claims the benefit under 35 USC § 119(a) of Korean Patent Application No. 10-2021-0017645 filed on Feb. 8, 2021, and Korean Patent Application No. 10-2021-0058640 filed on May 6, 2021, in the Korean Intellectual Property Office, the entire disclosures of which are incorporated herein by reference for all purposes.

BACKGROUND

1. Field

The following description relates to a memory control, and more particularly, to a processing in memory (PIM) control technology.

2. Description of Related Art

In a standard model that is well-known as a von Neumann architecture, data is stored in a memory. The memory may be separated from a processor, and the data may move between the processor and the memory. In such an architecture, a delay may occur due to frequent movements of data. When the speed of the processor increases, the memory may be improved. However, the improvement of the memory may be to improve the performance of storing a greater quantity of data in a smaller space, instead of improving a transfer speed. An increase in the waiting time used to wait until data is fetched from the memory to the processor may limit the speed of the processor to a transfer speed at a bottleneck point. In a standard computer architecture, a von Neumann bottleneck at which throughput is limited due to the waiting time may occur. To prevent such a bottleneck, PIM may be used to perform an operation in a single-chip memory.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a memory controller including a first buffer configured to receive a first memory request from a host and to store the first memory request, a request scheduler configured to determine an order in which the first memory request is transferred to a command generator, a request generator configured to generate one or more second memory requests based on a generation parameter of the first memory request, in response to an address of the first memory request corresponding to a processing in memory (PIM) memory, the command generator being configured to generate a first command corresponding to the first memory request and one or more second commands corresponding to the one or more second memory requests, and to store the generated first command and the one or more second commands in a second buffer, and a command scheduler configured to schedule the first command and the one or more second commands.

The generation parameter may include a command type, address-related information, data-related information, or a generation number.

The request generator may be configured to determine addresses of the one or more second commands based on the address of the first memory request and the address-related information, and generate the one or more second memory requests based on the command type comprised in the generation parameter.

The request generator may be configured to determine addresses corresponding to the one or more second commands based on the address of the first memory request and the address-related information, and generate the one or more second memory requests based on the data-related information comprised in the generation parameter.

The request generator may be configured to determine addresses corresponding to the one or more second commands based on the address of the first memory request and the address-related information, and generate the one or more second memory requests based on the generation number comprised in the generation parameter.

The address-related information may include an address offset, wherein the request generator may be configured to determine, to be respective addresses of the one or more second commands, one or more addresses that are different from the address of the first memory request by an integer multiple of the address offset.

In another general aspect, there is provided a memory control method performed by a memory controller, the method comprising receiving, by a first buffer, a first memory request from a host and storing the received first memory request, determining, by a request scheduler, an order in which the first memory request is transferred to the command generator, generating, by the request generator, one or more second memory requests based on a generation parameter of the first memory request, in response to an address of the first memory request corresponding to a processing in memory (PIM) memory, generating, by the command generator, a first command corresponding to the first memory request and one or more second commands corresponding to the one or more second memory requests, and scheduling, by the command scheduler, the first command and the one or more second commands.

The generation parameter may include a command type, address-related information, data-related information, or a generation number.

The generating of the one or more second memory requests may include determining, by the request generator, addresses corresponding to the one or more second commands based on the address of the first memory request and the address-related information, and generating, by the request generator, the one or more second memory requests based on the command type comprised in the generation parameter.

The generating of the one or more second memory requests may include determining, by the request generator, addresses corresponding to the one or more second commands based on the address of the first memory request and the address-related information, and generating, by the request generator, the one or more second memory requests based on the data-related information comprised in the generation parameter.

The generating of the one or more second memory requests may include determining, by the request generator, addresses corresponding to the one or more second commands based on the address of the first memory request and the address-related information, and generating, by the request generator, the one or more second memory requests based on the generation number comprised in the generation parameter.

The address-related information may include an address offset, wherein the generating of the one or more second memory requests may include determining, by the request generator, to be respective addresses of the one or more second commands, one or more addresses that are different from the address of the first memory request by an integer multiple of the address offset.

In another general aspect, there is provided a memory controller include a request generator configured to generate one or more memory requests based on a preset generation parameter, in response to a memory address being received from a host corresponding to a preset address, a first buffer configured to store the one or more memory requests, a request scheduler configured to determine an order in which the one or more memory requests are transferred to a command generator, the command generator is configured to generate commands corresponding to the one or more memory requests and to store the generated commands in a second buffer, and a command scheduler configured to schedule the commands.

The generation parameter may include a command type, address-related information, data-related information, and a generation number.

The memory address may correspond to a processing in memory (PIM) memory.

The request scheduler may be configured to transfer the one or more memory requests to a second buffer, in response to the one or more memory requests being a memory request for the general memory area.

The request scheduler may be configured to transfer the one or more memory requests to a second buffer, in response to a memory address of the one or more memory requests not corresponding to the preset address.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
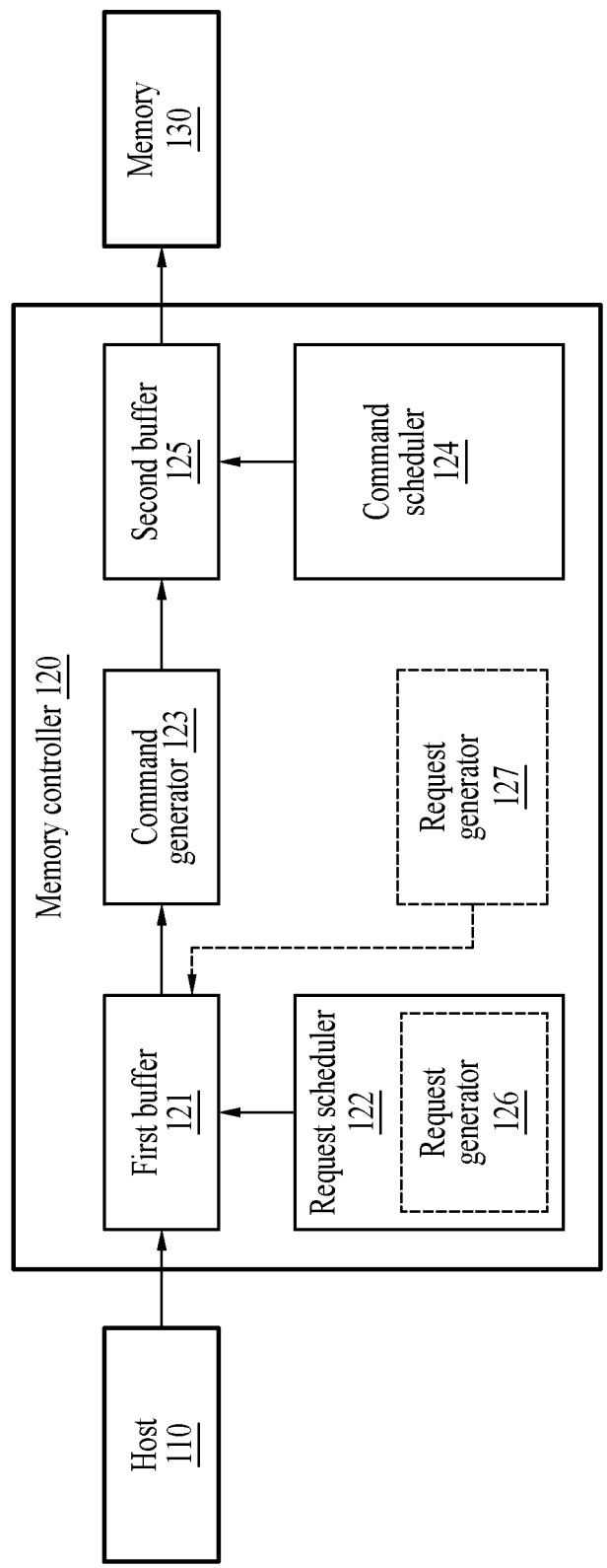
FIG. 1 illustrates an example of a configuration of a memory controller.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of a configuration of a memory controller.

When a memory request for a general memory area and a memory request for a processing in memory (PIM) memory area are performed in the same interface, an area separating bit that indicates the PIM memory area may be needed to separate the general memory area and the PIM memory area. In an example, a memory controller may determine whether a memory request corresponds to the general memory area or the PIM memory area based on the area separating bit.

In addition, in response to a PIM instruction being provided directly to the memory controller by a host, a PIM instruction decoder and an instruction queue may be needed. The PIM instruction may be included in a data region of a write request for the general memory area. In an example, the PIM instruction may be converted to a memory request for the PIM memory area through the PIM instruction decoder.

When the area separating bit is included in a memory request, an interface change between the host and the memory controller may be needed. In addition, because a memory request to be generated includes a PIM command that is not used in an existing memory system, an interface change between a memory and the memory controller may be needed.

In an example, referring to FIG. 1, a memory controller 120 may generate a command corresponding to a memory request for a PIM memory area without changing an interface of a memory 130. The memory controller 120 may generate a memory request corresponding to a general memory area and a command corresponding to a memory request for the PIM memory area in the same interface. The memory controller 120 may separate the general memory area and the PIM memory area, and generate a new memory request when a memory request corresponds to the PIM memory area.

In an example, the memory controller 120 may generate a new memory request based on a previous memory request. A typical memory controller may generate a single memory command by processing a memory request when the memory request is received. However, when a sufficient number of memory requests is not received by the host, a memory bandwidth may not be fully utilized.

The memory controller 120 may generate a new memory request inside the memory controller 120, and may thus fully utilize the memory bandwidth despite an insufficient number of memory requests. The memory controller 120 may thus prevent the memory bandwidth from being wasted in a multi-thread environment.

The memory controller 120 and a memory control method performed by the memory controller 120 may be applied to a processor associated with a PIM memory. For example, the PIM memory may be provided as a semiconductor chip. For example, the PIM memory may be provided inside another semiconductor. The PIM memory may be provided in a semiconductor chip such as a graphics processing unit (GPU) or a mobile processor. However, examples of the PIM memory are not limited to the foregoing examples, and the PIM memory may be applied to all devices that use a memory.

Referring to FIG. 1, the memory controller 120 may include a first buffer 121, a request scheduler 122, a command generator 123, a command scheduler 124, and a second buffer 125. The memory controller 120 may generate a new memory request using data and address information of a memory request in the memory controller 120 without an interface change.

In an example, the command generator 123 and the command scheduler 124 may be integrated into one device. The device may be referred to as a command controller. The command controller may perform operations of the command generator 123 and the command scheduler 124.

The memory controller 120 may include a request generator. The request generator may be included in the request scheduler 122 as a request generator 126, or be present independently as a request generator 127. A host 110 may include various types of processors. The host 110 may include, for example, a GPU or a central processing unit (CPU). For example, the host 110 may include an input and output device that transfers a request directly to a memory area, and not through a processor. For example, the host 110 may include an input and output device that transfers a request to the memory controller 120 through a direct memory access (DMA) controller in addition to a processor. However, examples are not limited to the foregoing examples, and the host 110 may include all types of devices that transfer a memory request to the memory controller 120.

The memory controller 120 may receive a memory request from the host 110. When the memory controller 120 receives the memory request from the host 110, the memory controller 120 may generate a command for accessing the memory 130 and store the generated command in a queue.

The first buffer 121 may store, in a queue, one or more memory requests received from the host 110. The queue may be a waiting line for the memory requests that is provided in a form of a queue. The first buffer 121 may transfer the memory requests stored in the queue to the command generator 123. The first buffer 121 may sequentially transfer the memory requests stored in the queue to the command generator 123. An order in which the memory requests stored in the queue are transferred may be changed by the request scheduler 122.

The memory controller 120 may separate a memory request for a general memory area and a memory request for a PIM memory area based on information included in a received memory request. Hereinafter, a memory request received from the host 110 will be referred to as a first memory request, and a newly generated memory request will be referred to as a second memory request. In addition, a command to be generated in response to the first memory request will be referred to as a first command, and a command to be generated in response to the second memory request will be referred to as a second command.

When a first memory request received from the host 110 is a memory request for the general memory area, the memory controller 120 may transfer the first memory request to the first buffer 121. When the first memory request is a memory request for the PIM memory area, the memory controller 120 may generate a new memory request using data and address information of the first memory request. The memory controller 120 may generate the new memory request to utilize the data region. A memory request to be received from the host 110 to generate a new memory request may be a request to write or a request for read. However, examples are not limited thereto, and various types of memory requests may be included.

The data region may be classified into two types. The data region may be configured in a form of a group of memory requests for the general memory area or in a form of auxiliary data such as a loop counter or an address offset for using an address region. When a memory request is a request for write, the data region may be defined inside the memory controller 120 or initialized to a value received from an outside.

When a first memory request corresponds to the PIM memory area, the request generator 126 may generate one or more second memory requests based on a generation parameter of the first memory request. The generated second memory requests may be stored in the first buffer 121.

In an example, the generation parameter may include a command type, address-related information, data-related information, and a generation number. The command type may include, for example, activate, pre-charge, refresh, read, and write, but examples of which are not limited thereto. The address-related information may include an address of a command corresponding to a memory request or auxiliary data for determining an address to be allocated to a new memory request. For example, the auxiliary data of the address-related information may include information such as the address offset or the loop counter, and a new address may be determined by a value obtained by adding an existing address and an integer multiple of the address offset. However, examples are not limited to the foregoing example.

The data-related information may include data of a command corresponding to a memory request or auxiliary data for determining data of a command corresponding to a new memory request. For example, when the command type is "write," the auxiliary data of the data-related information may include information such as a data offset, and new data may be determined by a value obtained by adding or multiplying existing data and an integer multiple of the data offset. However, examples are not limited to the foregoing example.

In one example, the request generator 126 may determine addresses corresponding to one or more second commands based on an address of a first memory request and the address-related information. The request generator 126 may generate a second memory request based on a command type of a generation parameter. The request generator 126 may determine a type of a command of the second memory request to be different from a type of a command of the first memory request.

In another example, the request generator 126 may determine addresses of one or more second commands based on an address of a first memory request and address-related information. The request generator 126 may generate a second memory request based on data-related information of a generation parameter.

In another example, the request generator 126 may determine addresses of one or more second commands based on an address of a first memory request and address-related information. The request generator 126 may generate a second memory request based on a generation number of a generation parameter.

In another example, the address-related information of the generation parameter may include the address offset. The request generator 126 may determine, to be respective addresses of the second commands, one or more addresses that are different from the address of the first memory request by an integer multiple of the address offset.

The request scheduler 122 may determine an order in which first memory requests are to be transferred to the command generator 123. The request scheduler 122 may transfer the first memory requests to the command generator 123 in an order of the first memory requests being stored in the first buffer 121 or in an order different from the order of the first memory requests being stored in the first buffer 121, for effective memory access.

The command generator 123 may generate a first command corresponding to a first memory request and one or more second commands corresponding to one or more second memory requests. The command generator 123 may generate the first command using information associated with the first memory request. The command generator 123 may generate the first command using a command type, data, or an address of the first memory request. The command generator 123 may generate the second commands using information associated with the second memory requests. The command generator 123 may generate the second commands using a command type, data, or an address of the second memory requests.

The command scheduler 124 may perform scheduling on the first command and the second commands. The command scheduler 124 may maintain or change an order of the first command and the second commands being stored in the second buffer 125.

The memory 130 may include a general memory and a PIM memory. An address of the memory 130 may be classified into an address allocated to the general memory and an address allocated to the PIM memory. Through such an allocation of the address of the memory 130, the memory 130 may be separated into the general memory area and the PIM memory area.

The memory 130 may have a plurality of channels. The memory 130 may have areas divided by a channel unit, and in an example, each channel unit may operate independently. Each channel may correspond to a separate memory controller. One channel may correspond to a first memory controller, and another channel may correspond to a second memory controller. When memory requests occur from a plurality of hosts such as processors or DMA controllers, the memory requests may be divided by each memory channel based on an address. The operations described above may be performed in parallel by corresponding memory controllers of channels respectively corresponding to the memory requests.

In another example, the memory controller 120 may generate a new memory request in response to an address of the memory 130 being received from the host 110. In this example, when the address of the memory 130 received from the host 110 corresponds to a preset address, the request generator 126 may generate one or more memory requests based on a preset generation parameter. The first buffer 121 may store the memory requests. The request scheduler 122 may determine an order in which the memory requests are transferred to the command generator 123. The command generator 123 may generate commands corresponding to the memory requests and store the commands in the second buffer 125. The command scheduler 124 may perform scheduling on the commands.

Figure 2:
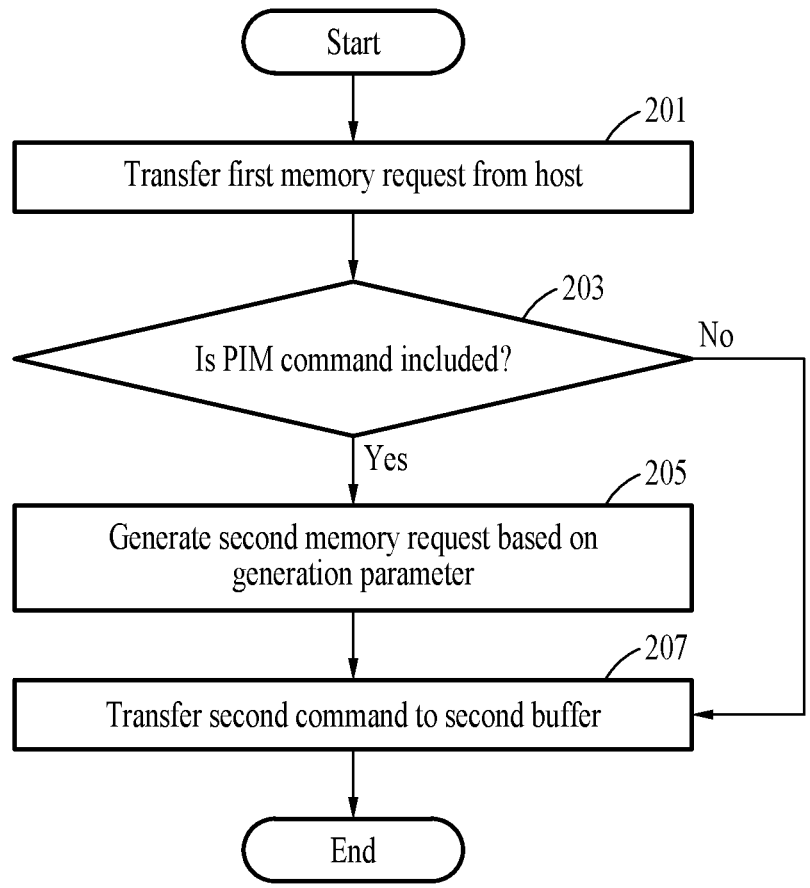
FIG. 2 illustrates an example of a flow of operations performed by a memory controller.

FIG. 2 illustrates an example of a flow of operations performed by a memory controller. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. Operations 201 to 207 of FIG. 2 may be performed by the memory controller 120. One or more blocks of FIG. 2, and combinations of the blocks, can be implemented by special purpose hardware-based computer, such as a processor, that perform the specified functions, or combinations of special purpose hardware and computer instructions. In addition to the description of FIG. 2 below, the descriptions of FIG. 1 are also applicable to FIG. 2, and are incorporated herein by reference. Thus, the above description may not be repeated here.

Referring to FIG. 2, in operation 201, the memory controller 120 may receive a first memory request from the host 110. The host 110 may include a processor such as a GPU or a CPU. In an example, the host 110 may transfer the memory request directly to a memory area, and not through the processor.

In operation 203, the memory controller 120 may determine whether the first memory request corresponds to a PIM memory area. The memory controller 120 may determine whether the received first memory request is a memory request for a general memory area or a memory request for the PIM memory area based on information included in the first memory request. When the first memory request is the memory request for the general memory area, in operation 207, the memory controller 120 may transfer the first memory request to the second buffer 125.

In operation 205, when the first memory request is the memory request for the PIM memory area, the memory controller 120 may generate a second memory request based on a generation parameter. For example, when an address of the first memory request corresponds to a PIM memory, the memory controller 120 may generate one or more second memory requests based on the generation parameter of the first memory request.

In operation 207, the memory controller 120 may generate a second command based on the generated second memory request, and transfer the generated second command to the second buffer 125. In an example, the second command may be executed based on an order in a queue of the second buffer 125.

Figure 3:
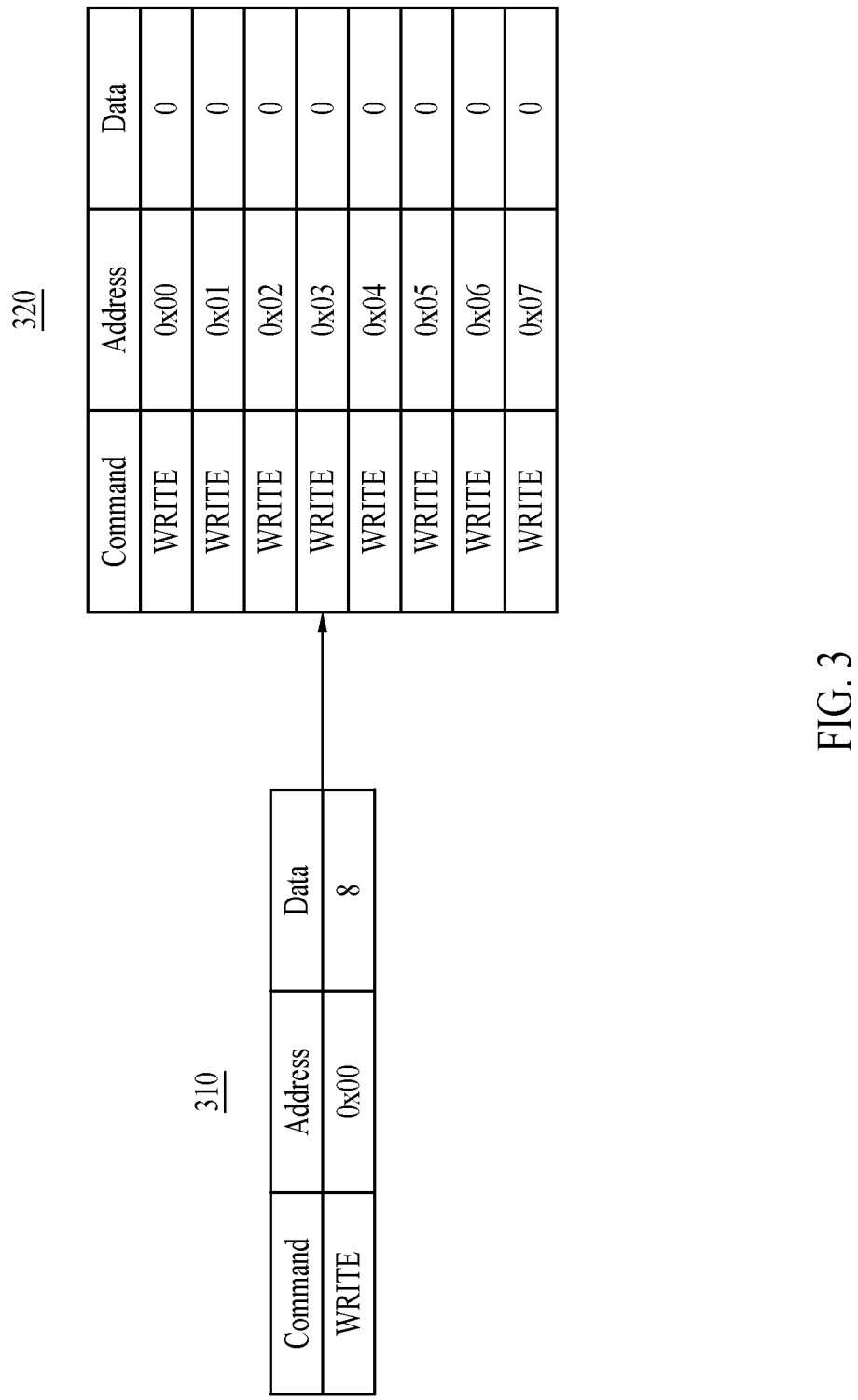
FIG. 3 illustrates an example of a field in which an address included in a memory request used in a memory controller.

FIG. 3 illustrates an example of generating a memory request by a memory controller.

Referring to FIG. 3, the memory controller 120 may generate a new memory request based on an existing memory request. The memory controller 120 may generate the new memory request in the memory controller 120, and may thus maximally utilize a memory bandwidth despite an insufficient memory request.

The memory controller 120 may receive a first memory request from the host 110 and generate a command for accessing the memory 130, and store the command in a queue. Referring to FIG. 3, a first memory request 310 may be transferred from the host 110 to the memory controller 120. The first memory request 310 may be temporarily stored in the first buffer 121.

The memory controller 120 may separate a memory request for a general memory area and a memory request for a PIM memory area based on information included in a received memory request. When an address of the first memory request 310 corresponds to a PIM memory, the memory controller 120 may generate one or more second memory requests 320 based on a generation parameter of the first memory request 310. In an example, the memory controller 120 may generate the second memory requests 320 based on a command type, address-related information, data-related information, or a generation number.

Referring to FIG. 3, the command type, the address, and data of the first memory request 310 may be WRITE, 0x00, and 8, respectively. The address-related information of the generation parameter may include an address offset. In the example of FIG. 3, the address offset may be 0001. In the example of FIG. 3, the data-related information may be a data offset, and the data offset may be 0000. The generation number may be 7.

The memory controller 120 may determine, to be respective addresses of the second memory requests 320, seven addresses that are different from the address 0x00 of the first memory request 310 by an N multiple of the address offset 0001, where N denotes a natural number. The memory controller 120 may determine 0x01 through 0x07 to be the addresses of the second memory requests 320 which are seven newly generated second memory requests. The memory controller 120 may determine commands and data of the second memory requests 320 in the same way as a command type WRITE of the first memory request 310 and data 0 of the first memory request 310. The memory controller 120 may generate the seven second memory requests 320.

Figure 4:
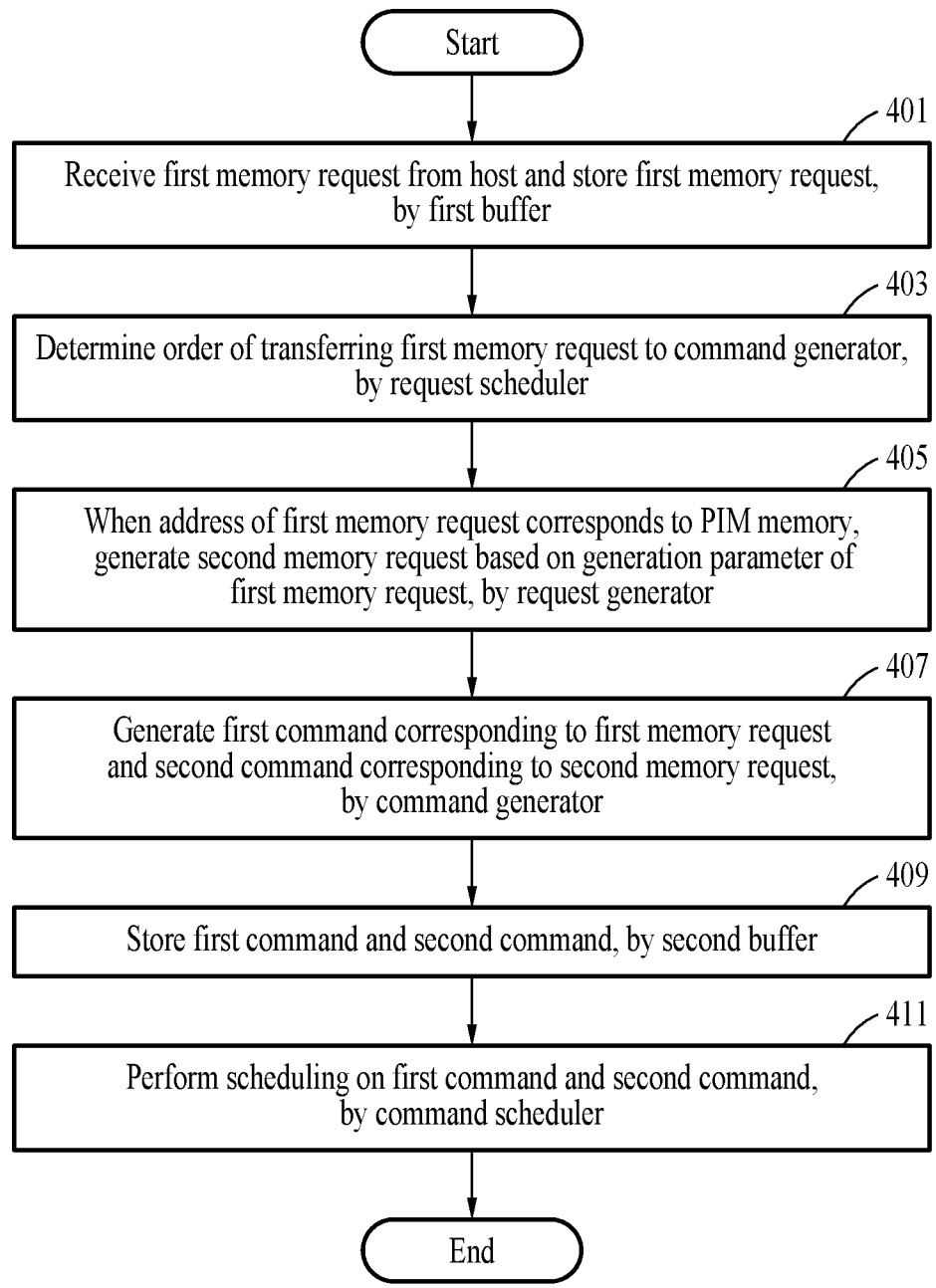
FIG. 4 illustrates an example of a memory control method.

FIG. 4 illustrates an example of a memory control method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. Operations 401 to 411 of FIG. 4 may be performed by the memory controller 120. One or more blocks of FIG. 4, and combinations of the blocks, can be implemented by special purpose hardware-based computer, such as a processor, that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here.

Referring to FIG. 4, in operation 401, the first buffer 121 may receive a first memory request from the host 110 and store the received first memory request.

In operation 403, the request scheduler 122 may determine an order in which the first memory request is transferred to the command generator 123.

In operation 405, when an address of the first memory request corresponds to a PIM memory, the request generator 126 may generate one or more second memory requests based on a generation parameter of the first memory request. The generation parameter may include a command type, address-related information, data-related information, and a generation number.

In an example, the request generator 126 may determine addresses corresponding to one or more second commands based on the address of the first memory request and the address-related information. The request generator 126 may generate the second memory requests based on the command type included in the generation parameter.

In another example, the request generator 126 may determine the addresses corresponding to the second commands based on the address of the first memory request and the address-related information. The request generator 126 may generate the second memory requests based on the data-related information included in the generation parameter.

In another example, the request generator 126 may determine the addresses corresponding to the second commands based on the address of the first memory request and the address-related information. The request generator 126 may generate the second memory requests based on the generation number included in the generation parameter.

In another example, the address-related information included in the generation parameter may include an address offset. The request generator 126 may determine, to be the addresses of the second commands, one or more addresses that are different from the address of the first memory request by an integer multiple of the address offset.

In operation 407, the command generator 123 may generate a first command corresponding to the first memory request and the second commands corresponding to the second memory requests.

In operation 409, the second buffer 125 may store the first command and the second commands.

In operation 411, the command scheduler 124 may perform scheduling on the first command and the second commands.

The memory controller, memory controller 120, first buffer 121, request scheduler 122, command generator 123, command scheduler 124, second buffer 125, request generators 126 and 127, and other apparatuses, devices, units, modules, and components described herein with respect to FIG. 1 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods illustrated in FIGS. 1-4 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In an example, the instructions or software includes at least one of an applet, a dynamic link library (DLL), middleware, firmware, a device driver, an application program storing the method of operating a processor. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A memory controller comprising:
a first buffer configured to receive a first memory request from a host and to store the first memory request;
a request scheduler configured to determine an order in which the first memory request is transferred to a command generator;
a request generator configured to identify the first memory request is a memory request for a processing in memory (PIM) memory in response to an address of the first memory request being determined to correspond to the PIM memory, and generate one or more second memory requests based on a generation parameter of the first memory request based on a result of the identifying;
the command generator being configured to generate a first command corresponding to the first memory request and one or more second commands corresponding to the one or more second memory requests, and to store the generated first command and the one or more second commands in a second buffer; and
a command scheduler configured to schedule the first command and the one or more second commands.

2. The memory controller of claim 1, wherein the generation parameter comprises a command type, address-related information, data-related information, or a generation number.

3. The memory controller of claim 2, wherein the request generator is further configured to:
determine addresses of the one or more second commands based on the address of the first memory request and the address-related information; and
generate the one or more second memory requests based on the command type comprised in the generation parameter.

4. The memory controller of claim 2, wherein the request generator is further configured to:
determine addresses corresponding to the one or more second commands based on the address of the first memory request and the address-related information; and
generate the one or more second memory requests based on the data-related information comprised in the generation parameter.

5. The memory controller of claim 2, wherein the request generator is further configured to:
determine addresses corresponding to the one or more second commands based on the address of the first memory request and the address-related information; and
generate the one or more second memory requests based on the generation number comprised in the generation parameter.

6. The memory controller of claim 2, wherein the address-related information comprises an address offset,
wherein the request generator is further configured to:
determine, to be respective addresses of the one or more second commands, one or more addresses that are different from the address of the first memory request by an integer multiple of the address offset.

7. A memory control method performed by a memory controller, the method comprising:
receiving, by a first buffer, a first memory request from a host and storing the received first memory request, the first memory request including an address;
determining, by a request scheduler, an order in which the first memory request is transferred to the command generator;
identifying the first memory request is a memory request for a processing in memory (PIM) memory based on the address of the first memory request;
generating, by the request generator, one or more second memory requests based on a generation parameter of the first memory request based on the identifying;
generating, by the command generator, a first command corresponding to the first memory request and one or more second commands corresponding to the one or more second memory requests; and
scheduling, by the command scheduler, the first command and the one or more second commands.

8. The memory control method of claim 7, wherein the generation parameter comprises a command type, address-related information, data-related information, or a generation number.

9. The memory control method of claim 8, wherein the generating of the one or more second memory requests comprises:
determining, by the request generator, addresses corresponding to the one or more second commands based on the address of the first memory request and the address-related information; and generating, by the request generator, the one or more second memory requests based on the command type comprised in the generation parameter.

10. The memory control method of claim 8, wherein the generating of the one or more second memory requests comprises:

determining, by the request generator, addresses corresponding to the one or more second commands based on the address of the first memory request and the address-related information; and generating, by the request generator, the one or more second memory requests based on the data-related information comprised in the generation parameter.

11. The memory control method of claim 8, wherein the generating of the one or more second memory requests comprises:

determining, by the request generator, addresses corresponding to the one or more second commands based on the address of the first memory request and the address-related information; and generating, by the request generator, the one or more second memory requests based on the generation number comprised in the generation parameter.

12. The memory control method of claim 8, wherein the address-related information comprises an address offset, wherein the generating of the one or more second memory requests comprises:

determining, by the request generator, to be respective addresses of the one or more second commands, one or more addresses that are different from the address of the first memory request by an integer multiple of the address offset.

13. A non-transitory computer-readable storage medium storing instructions that, when executed by a processor, cause the processor to perform the memory control method of claim 7.

14. A memory controller comprising:

a request generator configured to identify a first memory request is a memory request for a processing in memory (PIM) memory in response to an address of the first memory request being determined to correspond to the PIM memory, and generate one or more memory requests based on a preset generation parameter based on a result of the identifying;

a first buffer configured to store the one or more memory requests;

a request scheduler configured to determine an order in which the one or more memory requests are transferred to a command generator;

the command generator is configured to generate commands corresponding to the one or more memory requests and to store the generated commands in a second buffer; and a command scheduler configured to schedule the commands.

15. The memory controller of claim 14, wherein the generation parameter comprises a command type, address-related information, data-related information, and a generation number.

16. The memory controller of claim 14, wherein the memory address corresponds to a processing in memory (PIM) memory.

17. The memory controller of claim 14, wherein the request scheduler is further configured to transfer the one or more memory requests to the second buffer, in response to the one or more memory requests being a memory request for a general memory area.

18. The memory controller of claim 14, wherein the request scheduler is further configured to transfer the one or more memory requests to the second buffer, in response to a memory address of the one or more memory requests not corresponding to the preset address.

* * * * *